(12) United States Patent
Lewis et al.

(10) Patent No.: US 6,741,243 B2
(45) Date of Patent: May 25, 2004

(54) METHOD AND SYSTEM FOR REDUCING OVERFLOWS IN A COMPUTER GRAPHICS SYSTEM

(75) Inventors: Michael C. Lewis, San Jose, CA (US); Glenn Nissen, Moutain View, CA (US); Vadim Kochubievski, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 405 days.

(21) Appl. No.: 09/782,467

(22) Filed: Feb. 8, 2001

(65) Prior Publication Data

US 2001/0055012 A1 Dec. 27, 2001

Related U.S. Application Data

(60) Provisional application No. 60/201,034, filed on May 1, 2000.

(51) Int. Cl.[7] .............................................. G06T 15/00
(52) U.S. Cl. ........................ 345/419; 345/421; 345/619; 341/67
(58) Field of Search ................................. 345/501, 502, 345/503, 504, 505, 419, 421, 619, 423; 341/65, 67

(56) References Cited

U.S. PATENT DOCUMENTS

| 6,008,820 A | 12/1999 | Chauvin et al. |
| 6,344,852 B1 * | 2/2002 | Zhu et al. ................... 345/418 |
| 6,396,473 B1 * | 5/2002 | Callahan et al. ............ 345/530 |
| 6,424,345 B1 * | 7/2002 | Smith et al. ................ 345/423 |

FOREIGN PATENT DOCUMENTS

| EP | 590765 A2 | 6/1994 |
| WO | PCT/0010372 | 2/2000 |

* cited by examiner

*Primary Examiner*—Matthew C. Bella
*Assistant Examiner*—Mackly Monestime
(74) *Attorney, Agent, or Firm*—Sawyer Law Group LLP

(57) ABSTRACT

A method and system for providing a graphical image on a display of a system is disclosed. The graphical image is provided from data describing a plurality of primitives. The display includes a plurality of pixels. The method and system include providing a plurality of variable-sized bins containing the plurality of primitives and rendering the plurality of primitives by rendering each of the plurality of variable-sized bins variable-sized bin by variable-sized bin.

23 Claims, 12 Drawing Sheets

METHOD AND SYSTEM FOR REDUCING OVERFLOWS IN A COMPUTER GRAPHICS SYSTEM

This application claims the benefit of Provisional Application Ser. No. 60/201,034, filed May 1, 2001.

FIELD OF THE INVENTION

The present invention relates to graphics processing in a computer system, and more particularly to a method and system for more efficiently rendering a graphical image.

BACKGROUND OF THE INVENTION

A conventional computer graphics system can display a graphical image on a display. The display includes a plurality of display elements, known as pixels, typically arranged in a grid. In order to display objects, the conventional computer graphics system typically breaks the objects into a plurality of polygons. The conventional system then typically renders the polygons in a particular order. For a three-dimensional scene, the polygons are generally rendered from back to front as measured from the viewing plane of the display. Similarly, a two-dimensional scene can be displayed where polygons are rendered based on their layer. Shallower layers occlude deeper layers.

For example, FIG. 1 is a block diagram of a display 1 depicting a graphical image. The display includes a plurality of pixels 8, only one of which is labeled. The graphical image includes primitives 2, 3, 4, 5, and 6 which may be part of one or more objects. Each of the primitives 2, 3, 4, 5, and 6 may cover several pixels and includes a plurality of fragments. Each fragment includes data for a pixel intersected by the corresponding primitive. Thus, a fragment may include data relating to the color, texture, α values, and depth values for a particular primitive and a particular pixel.

One conventional method used in rendering the graphical image renders the image primitive by primitive in a particular order. For a three-dimensional scene, the primitives are generally rendered from back to front as measured from the viewing plane of the display. Similarly, a two-dimensional scene can be displayed where primitives are rendered based on their layer. Shallower layers occlude deeper layers. For example, the primitive 2 might be rendered first, followed in order by primitives 3, 4, 5, and 6.

FIG. 2A depicts another conventional method 10 for rendering a graphical image. FIG. 2B depicts a display 20 including the primitives 2, 3, 4, 5, and 6 which are rendered using the conventional method 10. Referring to FIGS. 2A and 2B, in order to render the graphic image, portions of the display 1 are rendered one at a time. Thus, a plurality of tiles, each tile having a fixed size, is defined, via step 12. A tile is typically a two-dimensional rectangle containing n xm pixels. The tiles 21, 22, 23, 24, 25, 26, 27, 28, and 29 are depicted in the display 20. The primitives 2, 3, 4, 5, and 6, or portions thereof, are then rendered tile by tile and primitive by primitive. For example, the portion of the primitive 2 in tile 21 is rendered first. When tile 21 has completed rendering, the portion of the primitive 4 in tile 22 is rendered. When tile 22 is completed, the portions of the primitives 4 and 6 in tile 23 are rendered. This process continues, rendering the graphical image primitive by primitive and tile by tile, until all primitives in all tiles have been rendered.

Although these conventional methods function, one of ordinary skill in the art will readily realize that it is desirable to provide data for an image in raster order. Furthermore, it would desirable if the image is efficiently rendered. Consequently, STELLAR SEMICONDUCTOR of San Jose, Calif. developed a system for rendering a graphical image pixel by pixel, in raster order. Raster order is from left to right and top to bottom across the display 1. This system is described in U.S. patent application Ser. No. 08/624,261, entitled "METHOD AND APPARATUS FOR IDENTIFYING AN ELIMINATING THREE-DIMENSIONAL OBJECTS VISUALLY OBSTRUCTED FORM A PLANAR SURFACE" filed on Mar. 29, 1996 now Pat. No. 5,926,181, and assigned to the assignee of the present application and in co-pending U.S. patent application Ser. No. 08/624,260, entitled "GRAPHICS PROCESSORS, SYSTEM AND METHOD FOR GENERATING SCREEN PIXELS IN RASTER ORDER UTILIZING A SINGLE INTERPOLATOR" filed on Mar. 29, 1996 now Pat. No. 5,933,210, and assigned to the assignee of the present application.

FIG. 3 depicts a high-level block diagram of one embodiment of such a computer graphics system 50. The system 50 includes a central processing unit (CPU) 52, a display 54, a user interface 56 such as a keyboard or mouse or other communicating device, a memory 58, and an image generating unit 60 coupled with one or more buses 58. The display 54 includes a display, such as the display 1. The display 14 also includes a display memory 55 to which data for pixels are written prior to being shown on the display 1. In order to display graphical images, the objects are broken into polygons to be used in rendering the objects. In a preferred embodiment, the polygons are rendered in raster order. That is, portions of the polygons are rendered pixel by pixel in the order of the pixels in the display 54.

The image generating unit 60 is used in rendering the graphical image. The image generating unit includes an interface 61 connected to the bus 58. The interface 61 transmits data to a data processing unit 62. The block of processors 64 identifies data describing portions of primitives ("intersecting primitives") which intersect the area extending along a z-axis from a selected pixel in an x-y plane corresponding to a screen of the display 14. The block of processors 64 may include a number of processors, allowing intersecting primitives to be processed in parallel. By processing the primitives in parallel, the block of processors 64 can provide an indication of the fragments that intersect pixels currently being processed in a particular scan line. An obstructed object identifier/removal unit (Quick Z) 66 receives at least a portion of the fragment from each intersecting polygon associated with the selected pixel and removes portions of the fragments for intersecting polygons that are obstructed.

The interpolator 68 receives the remaining fragments for the intersecting polygons for the selected pixel and interpolates the data, including interpolating texture, color, and alpha values for the fragment. The interpolator 68 also provides a coverage mask for each fragment. The coverage mask indicates the portion of the pixel that the fragment covers. The fragments for remaining intersecting polygons are provided by the interpolator 68 to a hardware sorter 70. The hardware sorter 70 sorts the fragments for the intersecting polygons based on the value of a key such as the z value, or depth value, for the fragment.

An antialiasing/blending/accumulating unit 72 performs antialiasing using the mask provided by the interpolator 68. The antialiasing unit 72 may multiple units used in antialiasing, accumulating data, and blending data. The antialiased data is provided to the display 14 pixel by pixel in raster order.

Although the above-mentioned co-pending applications function well for their intended purpose, the processors in the block of processors 64 may overflow. In order to render the images in raster order, a number of the primitives intersecting pixels in a particular scan line (a row of pixels on the display 1) are processed in parallel. There are also a finite number of processors in the block of processors 64. For example, in one embodiment, sixty-four processors are provided in the block of processor block 64. When a particular scan line contains a large number of primitives, more primitives than processors in the block of processors 64 may be attempted to be processed in parallel. The block of processors 64 may then overflow. Such an overflow is undesirable. Furthermore, efficient rendering of the graphical image is desired.

Accordingly, what is needed is a system and method for efficiently rendering a graphical image. It would be desirable if an overflow of processors can be avoided. The present invention addresses such a need.

SUMMARY OF THE INVENTION

The present invention provides a method and system for providing a graphical image on a display of a system. The graphical image is provided from data describing a plurality of primitives. The display includes a plurality of pixels. The method and system comprise providing a plurality variable-sized bins containing the plurality of primitives and rendering the plurality of primitives by rendering each of the plurality of variable-sized bins variable-sized bin by variable-sized bin. In a first aspect, the system also includes a plurality of processors for processing a portion of the plurality of primitives in parallel. In this aspect, the variable-sized bin providing step further includes the steps of storing the plurality of primitives in a plurality of bins and determining if a part of a portion of the plurality of bins can be combined without causing the plurality of processors to overflow. In this aspect, the method and system also comprise combining the part of the portion of the plurality of bins to provide the plurality of variable-sized bins if the part of the portion of the plurality of bins can be combined without causing the plurality of processors to overflow. The plurality of variable-sized bins can include fewer bins than the plurality of bins. In another aspect, the method and system further include determining a plurality of bins for a previous frame and providing the plurality of bins containing the plurality of primitives.

According to the system and method disclosed herein, the present invention efficiently separates the graphical image into variable-sized bins that can be separately rendered without overflowing the system.

DETAILED DESCRIPTION OF THE INVENTION

The present invention relates to an improvement in processing of graphical images. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
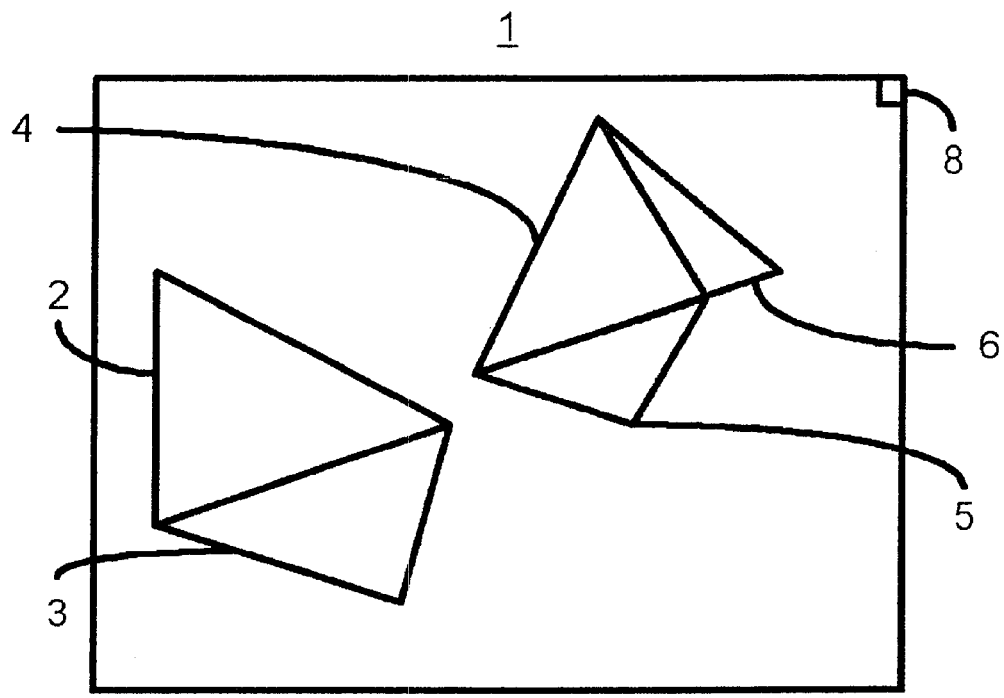
FIG. 1 is a diagram of a display including a graphical image.

As discussed above, FIG. 1 depicts a display 1 including a graphical image. The graphical image includes primitives 2, 3, 4, 5, and 6 which may be part of one or more objects. Each of the primitives 2, 3, 4, 5, and 6 may intersect several pixels and includes a plurality of fragments. Each fragment includes data for a pixel intersected by the corresponding primitive. Thus, a fragment may include data relating to the color, texture, $\alpha$ values, and depth values for a particular primitive and a particular pixel.

In order to render the graphical image, conventional computer graphics systems may employ a variety of methods. In one conventional system, the graphical image is rendered primitive by primitive. For example, the entire primitive 2 may be rendered first. The remaining primitives would then be rendered primitive by primitive.

Alternatively, a conventional computer graphics system could break the display 1 into several tile of fixed, typically equal, size. The conventional system then renders the graphical image tile by tile. Thus, the portions of each primitive in a particular tile are rendered before a portion of the primitives in another tile.

In order to improve the efficiency of memory use, a recently developed computer graphics system renders a graphical image pixel by pixel, in raster order. Thus, fragments for all of the primitives intersecting a particular pixel are rendered, then the fragments for primitives intersecting another pixel are rendered. Such a system 50 is depicted in FIG. 2.

Figure 2A:
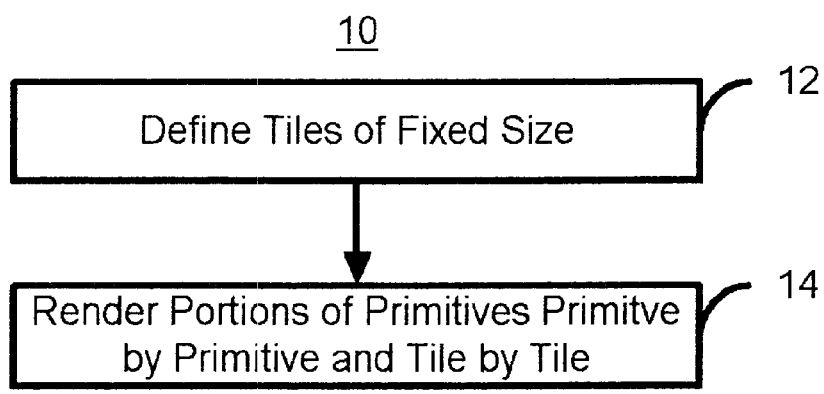
FIG. 2A is a high-level flow chart of a conventional method for rendering a graphical image.
Figure 2B:
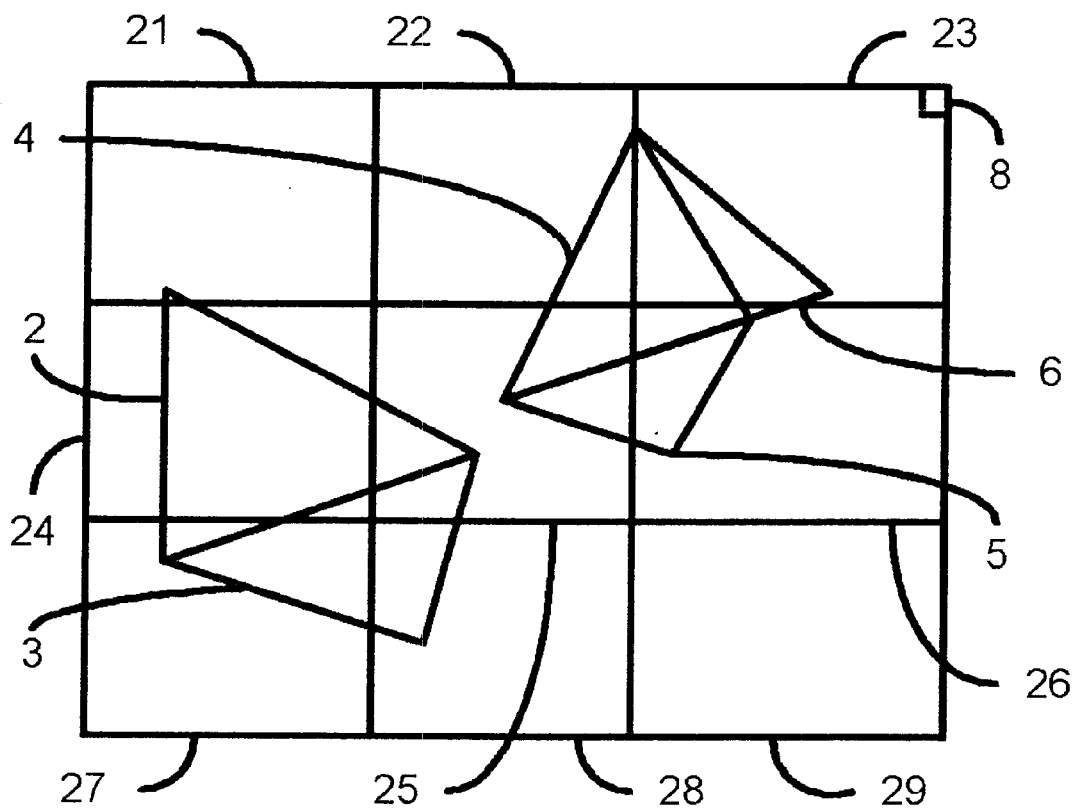
FIG. 2B is a diagram of the display when the conventional method is used to render the graphical image.

Although this method and system 50 depicted in and discussed in conjunction with FIG. 2 function effectively, the system 50 utilizes a plurality of processors in the block of processors 64. The processors processes primitives intersecting a particular scan line in parallel. Preferably all of the primitives intersecting a scan line are processed in parallel. Because there are a finite number of processors, the number of primitives intersecting a scan line can exceed the number of processors. Consequently, the processors in the block of processors 64 may overflow, which adversely affects system performance.

The present invention provides a method and system for providing a graphical image on a display of a system. The graphical image is provided from data describing a plurality of primitives. The display includes a plurality of pixels. The method and system comprise providing a plurality variable-sized bins containing the plurality of primitives and rendering the plurality of primitives by rendering each of the plurality of variable-sized bins variable-sized bin by variable-sized bin. In a first aspect, the system also includes a plurality of processors for processing a portion of the plurality of primitives in parallel. In this aspect, the variable-sized bin providing step further includes the steps of storing the plurality of primitives in a plurality of bins and determining if a part of a portion of the plurality of bins can be combined without causing the plurality of processors to overflow. In this aspect, the method and system also comprise combining the part of the portion of the plurality of bins to provide the plurality of variable-sized bins if the part of the portion of the plurality of bins can be combined without causing the plurality of processors to overflow. The plurality of variable-sized bins can include fewer bins than the plurality of bins. In another aspect, the method and system further include determining a plurality of bins for a previous frame and providing the plurality of bins containing the plurality of primitives.

The present invention will be described in terms of being implemented in a particular system for a particular reason. However, one of ordinary skill in the art will readily recognize that this method and system will operate effectively for other systems. Furthermore, the present inventions will be described in terms of specific algorithms. However, one of ordinary skill in the art will readily realize that the present invention is consistent with the use of other algorithms. For example, certain steps of the flow charts described herein could be performed in another order, including in parallel. In addition, the present invention can be implemented in hardware, rather than in software. The present invention will also be described in the context of a particular number and type of processors, sections, bins, and primitives. The present invention will also be described in terms of a particular overflow condition based on the number or processors. However, one of ordinary skill in the art will readily recognize that the present invention is consistent with another number and type of processors, sections, bins, and primitives as well as a different overflow parameter.

Figure 4A:
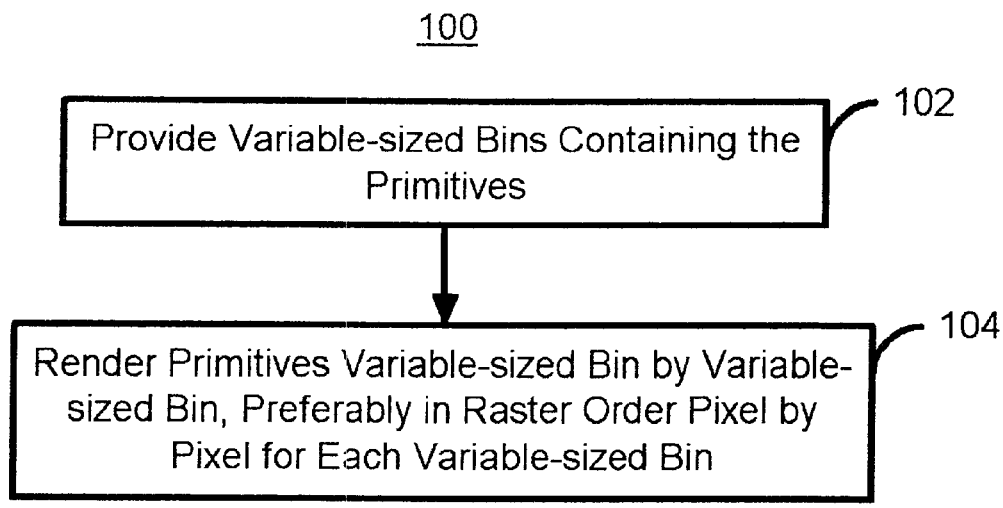
FIG. 4A is a high-level flow chart of one embodiment method for rendering a graphical image in accordance with the present invention.

To more particularly illustrate the method and system in accordance with the present invention, refer now to FIG. 4A, depicting a high-level flow chart of one embodiment of method for rendering a graphical image in accordance with the present invention. The method is preferably implemented on the system 50 depicted in FIG. 2. In a preferred embodiment, the method and system in accordance with the present invention is implemented by or include software that may be stored in the memory 59 and executed by the CPU 52. However, in another embodiment, the software could be stored elsewhere or executed by another processor (not shown), such as one residing with the image generation unit 60.

Figure 3:
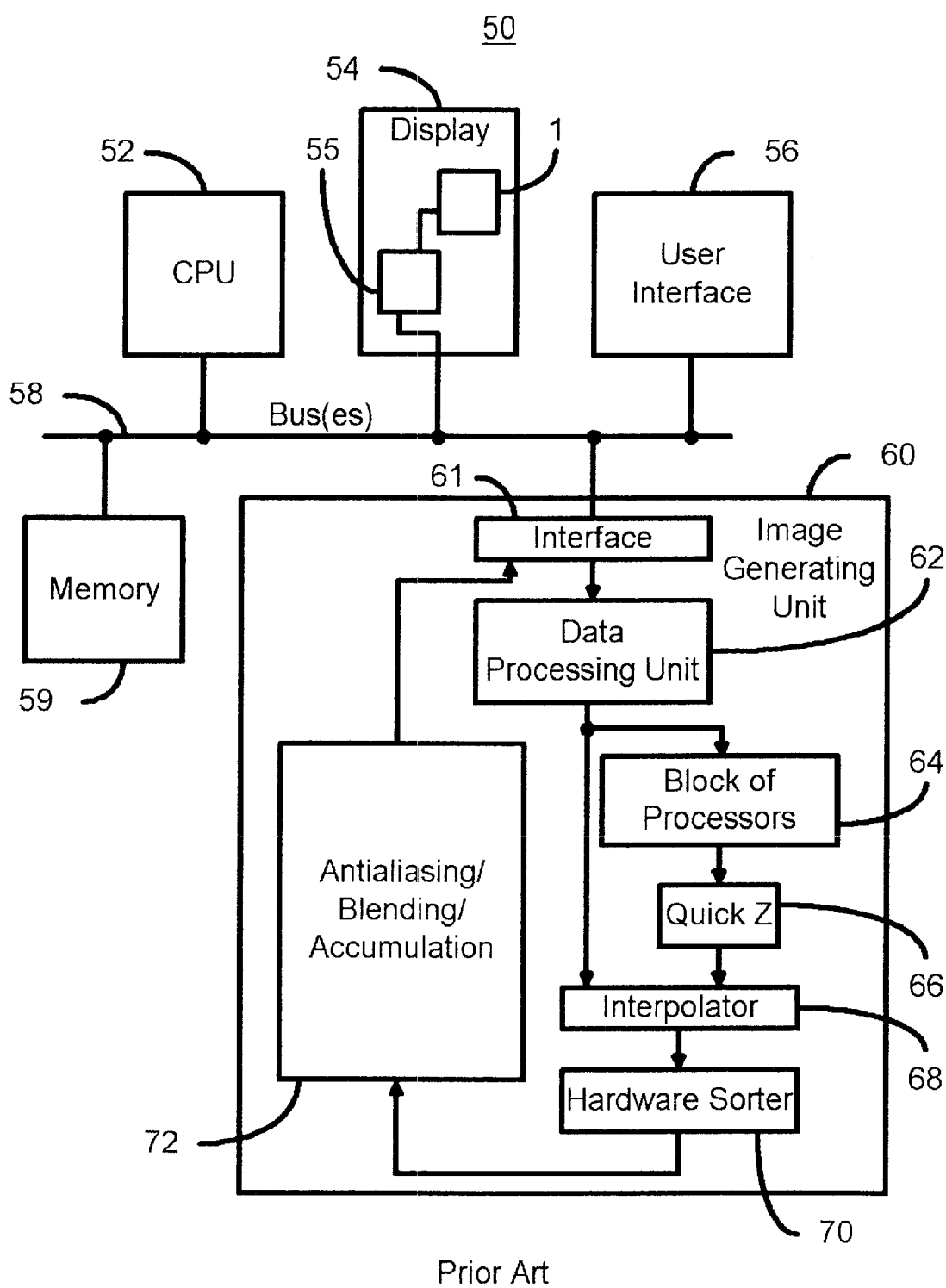
FIG. 3 is a high-level block diagram of a computer graphics system in which the present invention can be used.

Referring now to FIG. 4A, a plurality of variable-sized bins containing the primitives are provided, via step 102. A bin is variable sized when the section of the display (described below) to which the bin corresponds can vary in size. Preferably, the primitives intersecting a particular variable-sized bin are stored in the variable-sized bin based on the primitives' minimum y-value and whether or not the primitives cross the right boundary of the particular variable-sized bin. In a preferred embodiment, each of at least a portion of the variable-sized bins includes few enough primitives so that the processors in the block of processors 64 do not overflow. For example, if there are sixty-four primitives, then when possible, each variable-sized bin includes no more than 64 primitives per scan line. However, the primitives allowed in a particular variable-sized bin may depend on other criteria. The primitives are then rendered by rendering the variable-sized bins variable-sized bin by variable-sized bin, via step 104. Also in a preferred embodiment, step 104 includes rendering each of the variable-sized bins pixel by pixel in raster order. Thus, if only a portion of a primitive intersects a particular variable-sized bin, only that portion of the primitive is rendered when the particular variable-sized bin is rendered. Thus, step 104 preferably includes providing the primitives for a scan line in a variable-sized bin to the processors in the block of processors 64 of FIG. 3. The portions of the primitives intersecting pixels within the scan line are then processed by the system 50.

Figure 4B:
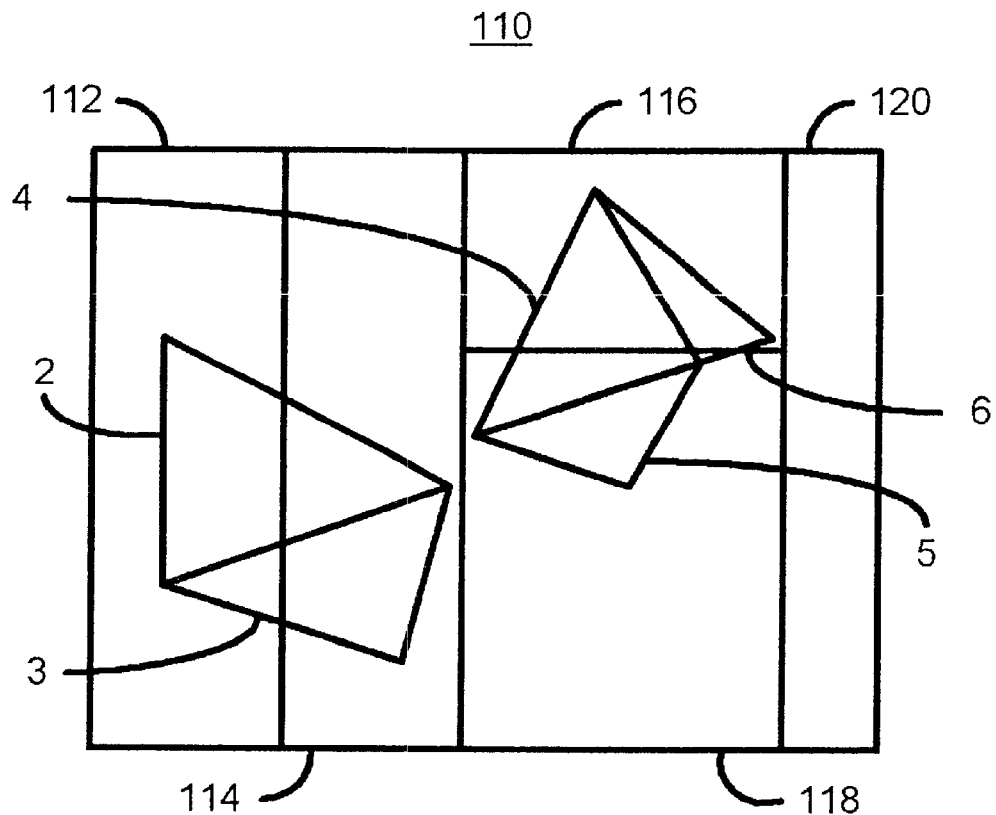
FIG. 4B is a diagram of one way in which a display could be divided in accordance with the present invention.

FIG. 4B depicts a generalized view of a display 110 including a graphical image. The display 110 is analogous to the display 1 depicted in FIG. 1. Thus, the graphical image includes primitives 2, 3, 4, 5, and 6. The graphical image has been broken into a plurality of variable-sized sections 112, 114, 116, 118 and 120. Each of the variable-sized sections 112, 114, 116, 118, and 120 corresponds to one of the variable-sized bins. One variable-sized bin stores data for the primitive 2 and the primitive 3 for the section 112. Similarly a second variable-sized bin stores data for the primitive 2 and the primitive 3 in the section 114. A third variable-sized bin stores data for the primitive 4 and the primitive 6 intersecting the section 116. A fourth variable-sized bin stores a data for the primitives 4, 5, and 6 in the section 118. A fifth variable-sized bin corresponds to the last section 120.

Figure 5A:
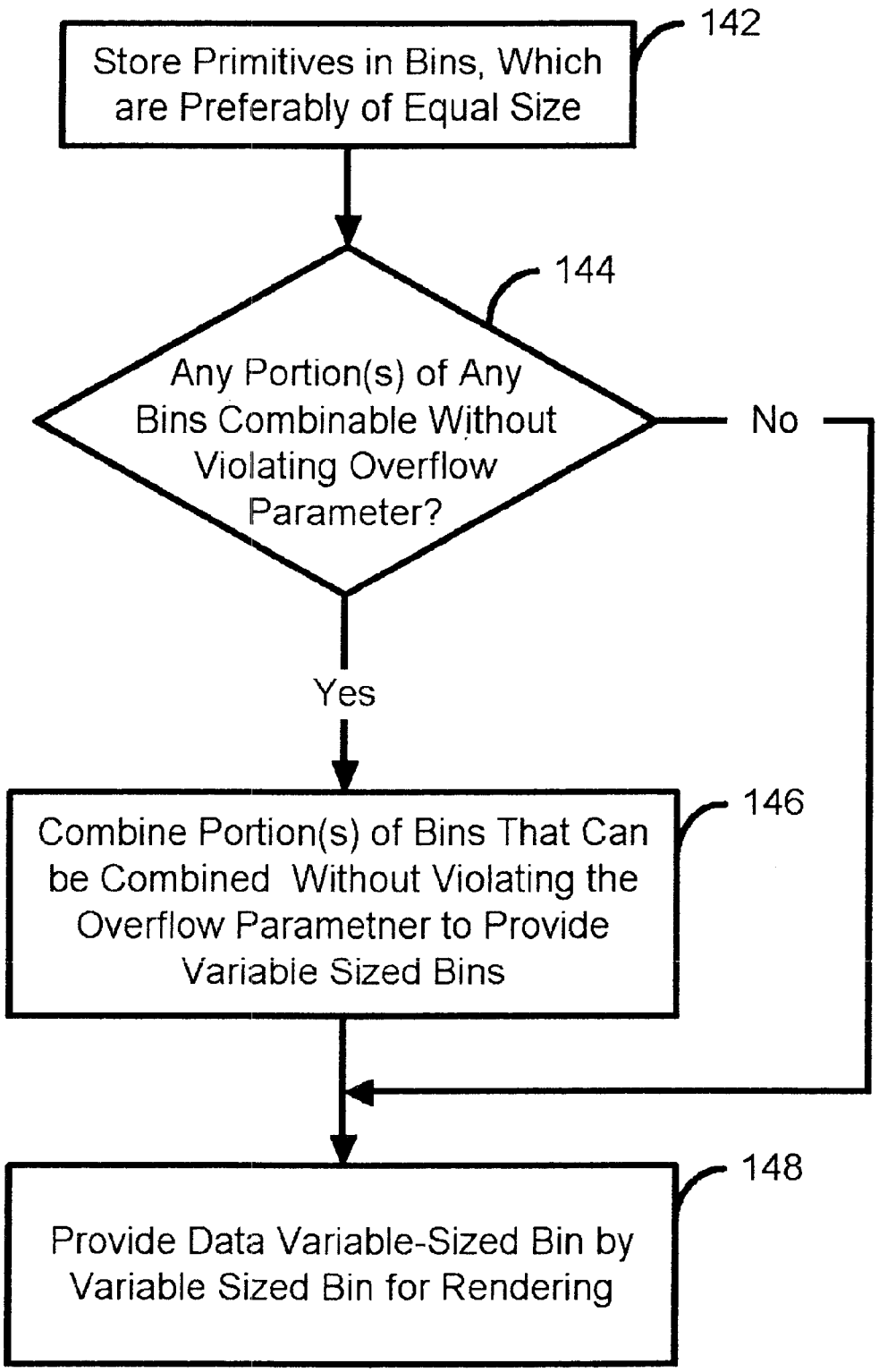
FIG. 5A is a flow chart of a first embodiment of a method for providing variable-sized bins in accordance with the present invention.

FIG. 5A depicts a more detailed flow chart of a first embodiment of a method 140 in accordance with the present invention for providing variable-sized bins. The primitives are stored in a plurality of bins, via step 142, preferably in order based on the minimum y-value of the primitives. Storing a primitive may include storing the desired information for the primitive. Thus, the primitives are preferably stored from top to bottom along the display 1. Preferably, the bins are of the same size. The size of a bin is determined by the size of a section, discussed below, to which the bin corresponds. It is determined whether any portions of the bins, preferably adjacent bins, can be combined without violating an overflow parameter, via step 144. In a preferred embodiment, step 144 determines whether any of the bins, in its entirety, can be combined with another bin, in its entirety. Also in a preferred embodiment, the overflow parameter corresponds to an overflow of the system. An overflow of the system occurs when there are more primitives in a bin than there are processors in the block of processors 64, depicted in FIG. 3. Referring back to FIG. 5A, the portions of bins that can be combined are then combined to provide the variable sized bins, via step 146. In a preferred embodiment, step 146 includes combining those bins, in there entirety, which step 144 determined could be combined without overflowing the processors to provide the variable-sized bins. Also in a preferred embodiment, portions of bins can be combined horizontally if the resulting bin crosses the entire display. The variable-sized bins are the provided for rendering, via step 148. Preferably, step 148 includes providing a display list including the primitives in each of the variable-sized bin, variable-sized bin by variable-sized bin. In one embodiment, steps 146 and 148 can be provided in a single step. Thus, the combining of bins could take place by ordering the primitives appropriately in the display list. The variable-sized bins may then be rendered pixel by pixel in raster order.

Figure 5B:
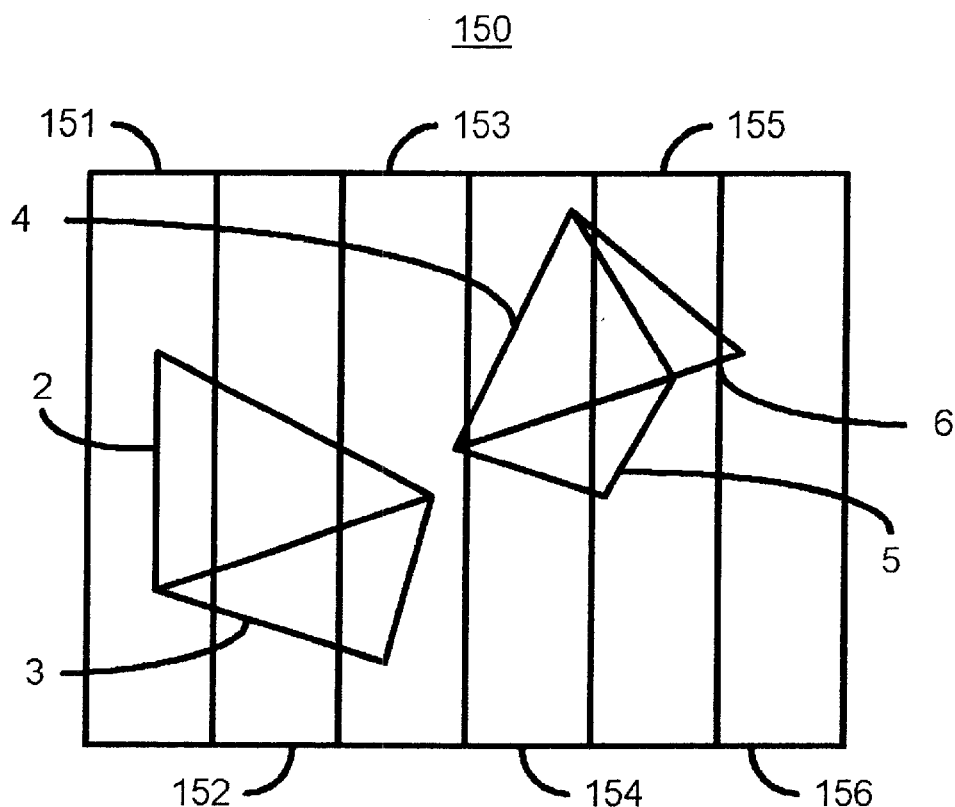
FIG. 5B is a diagram of one way in which a display could be divided in accordance when the first embodiment of a method in accordance with the present invention for providing variable-sized bins.
Figure 5C:
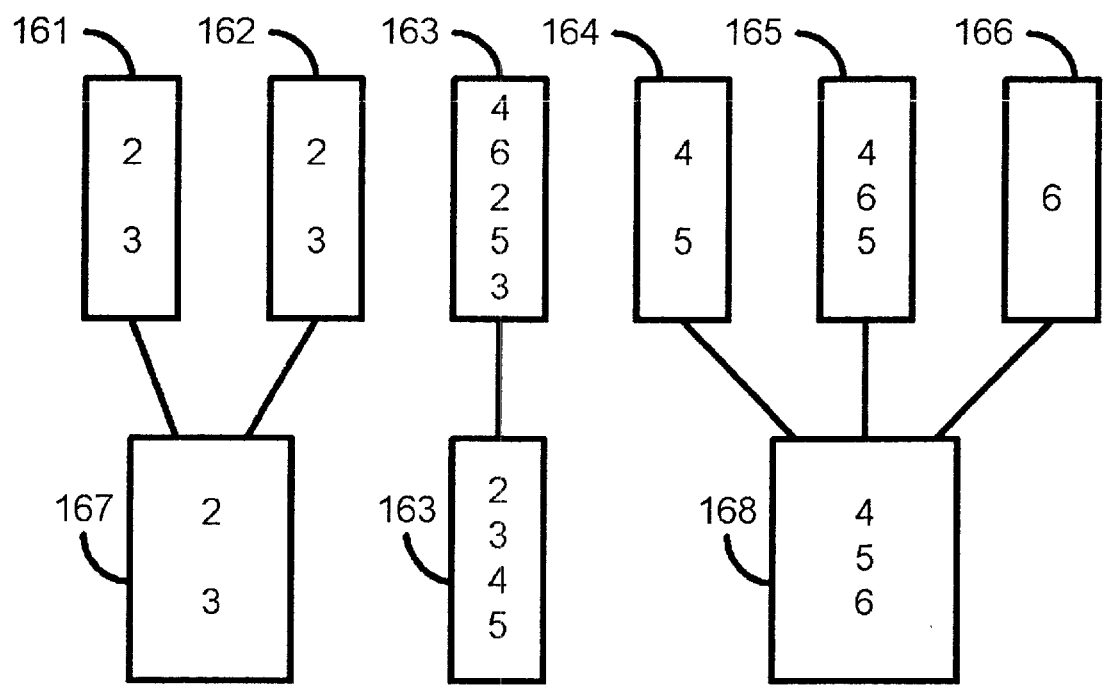
FIG. 5C is a diagram of how the bins are provided and combined in accordance when the first embodiment of a method in accordance with the present invention for providing variable-sized bins.

For an example of how the method 140 functions, refer to FIGS. 5A–5C. For clarity, it is presumed that there are only three processors in the block of processors 64, depicted in FIG. 2. Thus, the overflow parameter is three. FIG. 5B depicts one way in which the display 150 can be divided into sections when the method 140 is used. The display 150 corresponds to the display 1 and, therefore, includes primitives 2, 3, 4, 5, and 6. FIG. 5C depicts the bins 161–166 provided and combined by one preferred embodiment of the method 140. Preferably, the bins 161–166 are preferably of the same size. Thus, the sections 151–156 to which the bins 161–166 correspond are preferably of the same size. The display 150 is thus broken into sections 151, 152, 153, 154, 155, and 156 of equal size. Each section 151, 152, 153, 154, 155, and 156 corresponds to a particular bin 161, 162, 163, 164, 165, and 166, respectively. The primitives 2, 3, 4, 5, and 6 are stored in the bins 161–166 which correspond to the sections 161–166 that the primitives 2, 3, 4, 5, and 6 intersect. Furthermore, the primitives are stored in minimum y-value order. For example, the bin 163 includes primitive 4, 6, 2, 5, and 3, in that order. It is determined whether any of the bins 161–166 can be combined without causing an overflow. Suppose three processors are available. Thus, a bin 161–166 can be combined with another bin 161–166 if the combination has three or fewer primitives 2, 3, 4, 5, and 6. If section 151 and 152 are combined, there are only two primitives 2 and 3 present in the combined section. Similarly, if sections 154, 155, and 156 are combined, there will be three primitives 4, 5, and 6 present in the combined section. As a result, bins 161 and 162 and bins 164, 165, and 166 can be combined without violating the overflow parameter. It will thus be determined in step 144 that bins 161 and 162 and bins 164, 165, and 166 can be combined. Consequently, the bins 161 and 162 are combined to form bin the 167 and the bins 164–166 are combined to provide the bin 168, using step 146. Note that the bin 163 includes four primitives, 2, 3, 4, and 5. Consequently, bin 163 will cause the system to overflow even if it is not combined. In a preferred embodiment, bins 163 will be treated separately, for example by splitting or overlaying portions of the bin 163 to be rendered separately. At least the bins 167, 163, and 168 are thus the variable-sized bins provided for rendering.

Figure 6A:
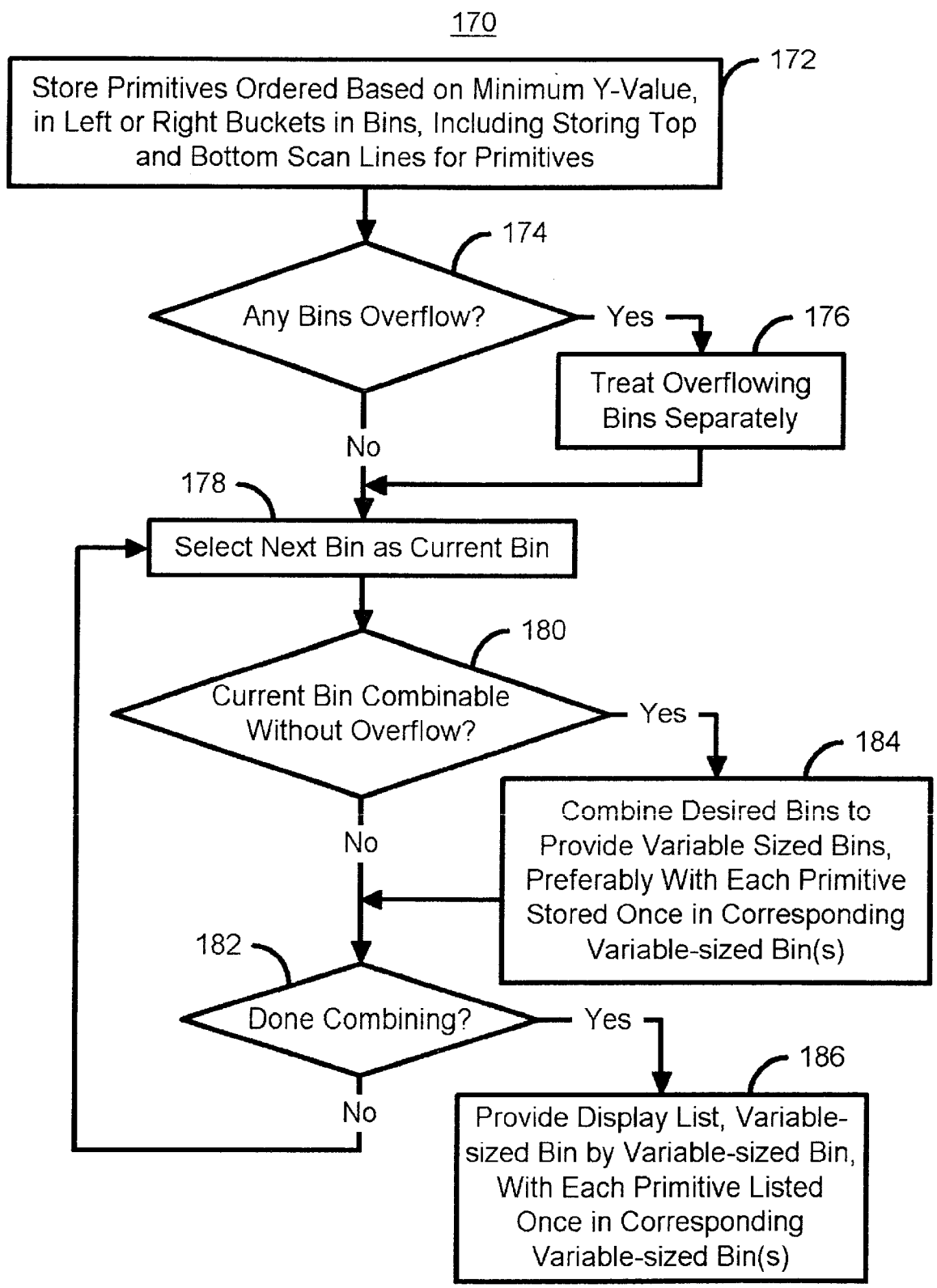
FIG. 6A is a more detailed flow chart of a preferred version of the first embodiment of a method for providing variable-sized bins in accordance with the present invention.

FIG. 6A depicts a more detailed flow chart of a preferred version of the first embodiment of a method 170 for providing the variable sized bins. The primitives 2, 3, 4, 5, and 6 are stored in the appropriate buckets of equal sized bins, via step 172. Each bin includes a left bucket and a right bucket. A primitive 2, 3, 4, 5, or 6 is stored in a right bucket if the primitive 2, 3, 4, 5, or 6 crosses a right boundary of a section corresponding to a particular bin. A primitive 2, 3, 4, 5, or 6 is stored in the left bucket if the primitive 2, 3, 4, 5, or 6 does not cross the right boundary of the section corresponding to the particular bin. Thus, storing the primitives 2, 3, 4, 5, and 6 may include storing the data for the primitives in the appropriate buckets. Step 172 also includes ordering the primitives 2, 3, 4, 5, and 6 in the buckets based on the primitives' minimum y values. Thus, the primitives 2, 3, 4, 5, and 6 are arranged from first to last in the appropriate buckets, based upon the highest point in the display 150 for the primitive. In addition, step 172 includes storing the top and bottom scans for each primitive. The top and bottom scans correspond to the minimum and maximum y-values for the primitive.

It is then determined if any of the bins overflow, via step 174. Thus, step 174 includes determining if any of the bins contain a sufficient number of primitives to violate the overflow parameter. Preferably this is accomplished in one step after the primitives 2, 3, 4, 5, and 6 have been stored in the appropriate bins. Step 174 is also preferably accomplished by using the top scan line and bottom scan line for each primitive store in a bin to determined the whether the number of primitives 2, 3, 4, 5, or 6 on a particular scan line of a bin is greater than the overflow parameter. If the certain bins overflow, then these bins are treated separately, via step 176. In a preferred embodiment, step 176 includes overlaying the bins which overflow. In another embodiment, step 176 could include splitting the bins that overflow is splitting the bin will prevent the overflow. In any event, step 176 includes a mechanism which will allow those bins that overflow, such as the bin163 depicted in FIG. 5C, to be processed preferably without causing an overflow of the system 50.

Referring back to FIG. 6A, a bin is selected as a current bin, via step 178. In a preferred embodiment, step 178 includes selecting a bin as the current bin only if the bin has been determined not to overflow in step 174. It is determined if the current bin can be combined with one or more other bins without the combination overflowing, via step 180. Preferably, at least one of the other bins is adjacent to the current bin and the other bins are mutually adjacent. If the current bin cannot be combined without an overflow, the current bin is considered to be one of the variable-sized bins. If the current bin cannot be combined without an overflow, then it is determined if all of the desired bins have been attempted to be combined, via step 182.

If it is determined that the current bin can be combined, then the current bin is combined with one or more other bins to provide one of the variable-sized bins, via step 184. The bin(s) with which the current bin are combined with are those which were determined in step 182. Preferably, the current bin is combined with other bin(s) such that a primitive in more than one bin only appears once in the variable-sized bin that results from the combination. Step 182 is then returned to. Step 182 determines whether all of the desired bins have been attempted to be combined. If not, then step 178 is returned to. If so, then a display list which orders the primitives variable-sized bin by variable-sized bin is provided, via step 186. In one embodiment, step 184 of combining the bins, is carried out by providing the display list in step 186. In such an embodiment, the primitives in the bins to be combined would be provided together in the display list without otherwise combining the bins.

Figure 6B:
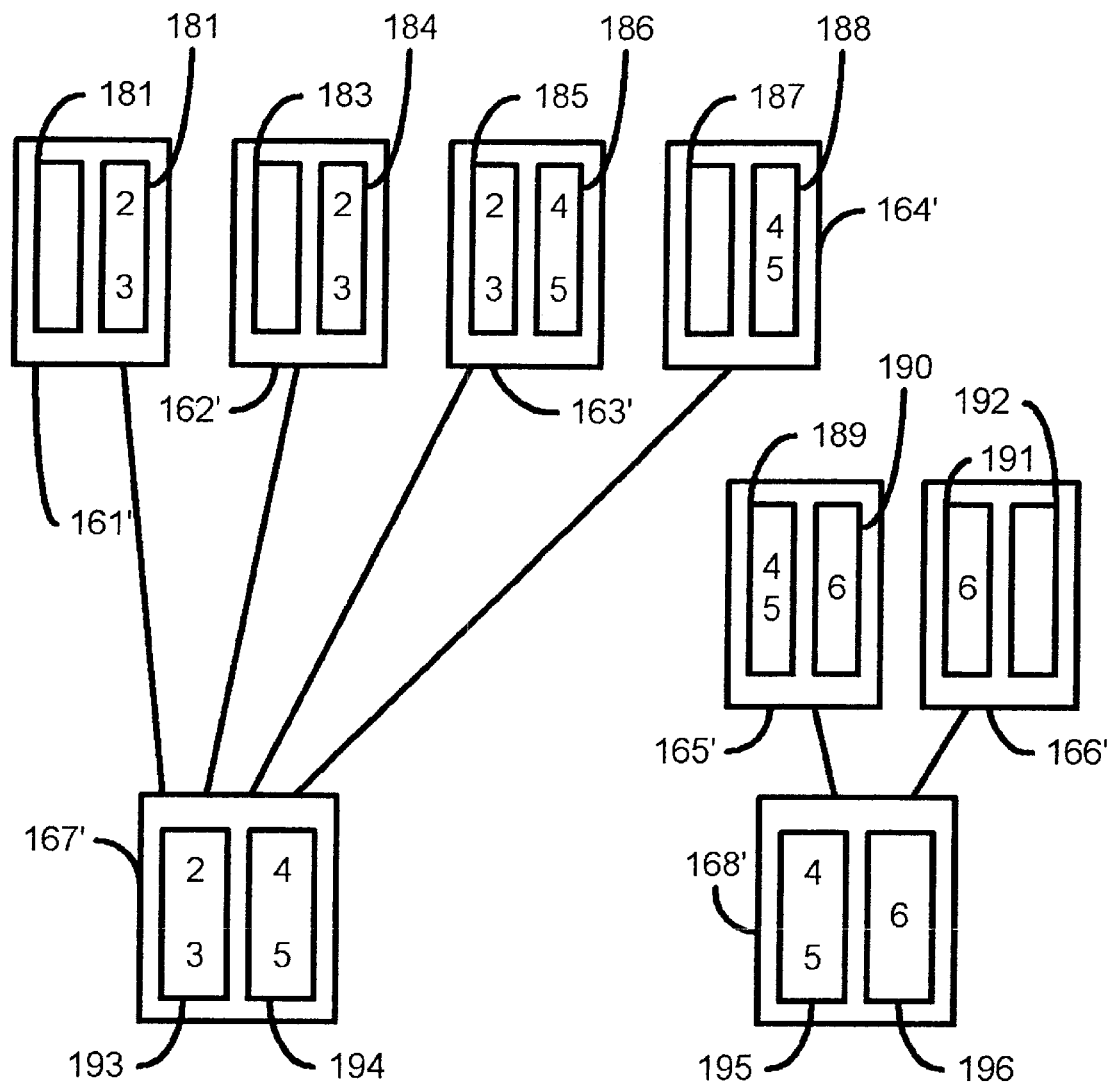
FIG. 6B is a diagram of how the bins are provided and combined in accordance when the preferred version of the first embodiment of a method in accordance with the present invention for providing variable-sized bins.

To further explicate the method 170, refer to FIGS. 6B and 5C. FIG. 6B is a diagram depicting how bins are combined. FIG. 5C depicts the sections 151, 152, 153, 154, 155, and 156 corresponding to the bins. The primitives 2, 3, 4, and 5 are stored in the bins 161', 162', 163', 164', 165', and 166'. The bins 161', 162', 163', 164', 165', and 166' correspond to the sections 151, 152, 153, 154, 155, and 156, respectively. Because the primitives 2 and 3 cross the right boundary of the bin 161' (the section 151), the primitives 2 and 3 are stored in the right bucket 182 of the bin 161'. Because there are no primitives in the display 150 that intersect bin 161' (the section 1521) but do not cross the right boundary of the bin 161' (the section 151), the left bucket 181 of the bin 161' is empty. Because the primitives 2 and 3 cross the right boundary of the bin 162' (the section 152), the primitives 2 and 3 are stored in the right bucket 184 of the bin 162'. Because there are no primitives that intersect bin 162' (the section 152) but do not cross the right boundary of the bin 162' (the section 152), the left bucket 183 of the bin 162' is empty. Because the primitives 4 and 5 cross the right boundary of the bin 163' (the section 153), the primitives 4 and 5 are stored in the right bucket 186 of the bin 163'. Because the primitives 2 and 3 intersect bin 163' (the section 153) but do not cross the right boundary of the bin 163' (the section 153), primitives 2 and 3 are stored in the left bucket 185 of the bin 163'. Because the primitives 4 and 5 cross the right boundary of the bin 164' (the section 154), the primitives 4 and 5 are stored in the right bucket 188 of the bin 164'. Because there are no primitives that intersect bin 164' (the section 154) but do not cross the right boundary of the bin 164' (the section 154), the left bucket 187 of the bin 164' is empty. Because the primitive 6 crosses the right boundary of the bin 165' (the section 155), the primitive 6 is stored in the right bucket 190 of the bin 165'. Because the primitives 4 and 5 intersect bin 165' (the section 155) but do not cross the right boundary of the bin 165' (the section 155), primitives 4 and 5 are stored in the left bucket 189 of the bin 165'. Because no primitives cross the right boundary of the bin 166' (the section 156), the right bucket 192 of the bin 166' is empty. Because the primitive 6 intersects bin 166' (the section 156) but does not cross the right boundary of the bin 166' (the section 156), the primitive 6 is stored in the left bucket 181 of the bin 162'.

It is presumed that there are four processors in the processor block 64 of FIG. 2. Thus, the overflow parameter may be four. Referring back to FIGS. 5A and 6B, none of the bins 161'–166', or the corresponding sections 151–156, include more than four primitives 2, 3, 4, 5, and 6. Consequently, none of the bins overflow. Thus, all of the bins 161'–166' are candidates to be combined. Because the overflow parameter is four, the bins 161', 162', 163', and 164' can be combined into bin 167' without overflowing. Thus, primitives 2, 3, 4, and 5 can be stored in a single bin 167' that corresponds to the bins 161'–164' and, therefore, to sections 151–154. For the same reasons, bins 165' and 166' can be combined into a single bin 168' without overflowing.

The bins 161'–166' are also preferably combined such that the primitives 2, 3, 4, and are stored only once in each variable sized bins 167' and 168'. Preferably, this is accomplished by storing only those primitives which are in the left bucket for a bin, except for the last bin that is being combined. For the last bin, those primitives in the right bucket and the left bucket are combined. For example, there are no primitives in the left bucket 181 or 183 for the bins 161' and 162'. Thus, no primitives are added. However, primitives 2 and 3 are in the left bucket 185 for the bin 163'. Consequently, primitives 2 and 3 are stored in the variable-sized bin 167'. However, the primitives 4 and 5 are in the right bucket 186 and thus are not stored when the bin 163' is combined. However, the primitives 4 and 5 are in the right bucket 188 for the last bin 164' being combined. Thus, the primitive 4 and 5 are stored in the variable-sized bin 167'. Consequently, the variable-sized bin 167' includes primitives 4 and 5 in the right bucket 194 and primitive 2 and 3 in the right bucket 193. Furthermore, the primitives 2, 3, 4, and 5 are stored in order in the variable-sized bin 167' based on their minimum y-values. Note, however, that in an alternate embodiment, the variable-sized bin 167' could include primitives 2 and 3 in both the right bucket 194 and the left bucket 193 and primitives 4 and 5 in the right bucket 194. In such a case, the right bucket 194 would store the primitive 2 ahead of the primitive 3 in the left bucket 193. Similarly, the right bucket 194 would store primitives 4, 2, 5, and 3 in order because this arranges the primitives 2, 3, 4, and 5 in minimum y-value order.

Similarly, the variable-sized bin 168' includes primitives 4, 5, and 6. When bin 165' is combined, primitives 4 and 5 in the left bucket 189 are stored in the left bucket 195 of the variable-sized bin 168'. The primitive 6 is not stored because it is in the right bucket 190 of the bin 165'. However, when the bin 165' is combined, the primitive 6 is stored because it is in the left bucket 191 of the bin 166'. If there were primitives in the right bucket 192, those primitives would have been stored in the variable-sized bin 168' because the bin 166' is the last bin being combined.

A display list is then provided from the variable-sized bins 167' and 168'. The display list preferably provides the primitives variable-sized bin by variable-sized bin and preferably orders the primitives in minimum y-value order. Consequently, the display list would include primitives 4, 2, 5, and 3 then primitives 4, 6, and 5. The portions of primitives 4, 2, 5, and 3 intersecting the variable-sized bin 167' (intersecting sections 151, 152, 153, and 154) are rendered first, followed by the portions of primitives 4, 6, and 5 intersecting the variable sized bin 168' (intersecting sections 155 and 156). The display list allows the primitives in a scan line to be provided in parallel to the processors of the block of processors in FIG. 3 and the pixels in each of the variable-sized bins 167' and 168' pixel by pixel in raster order.

Because the methods 100, 140, and 170 render the graphical image variable-sized bin by variable-sized bin, the efficiency of rendering is improved. Each variable-sized bin either does not overflow or is treated separately. In either case, each variable-sized bin can be rendered without causing an overflow in the computer graphics system, such as the system 50. Therefore, the primitives in a scan line for each variable-sized bin can be provided in parallel to processors in the block of processors 64. Each variable-sized bin can, therefore, be rendered pixel-by pixel in raster order without overflowing or slowing the system 50. Consequently, efficiency of providing graphical images is improved.

Figure 7A:
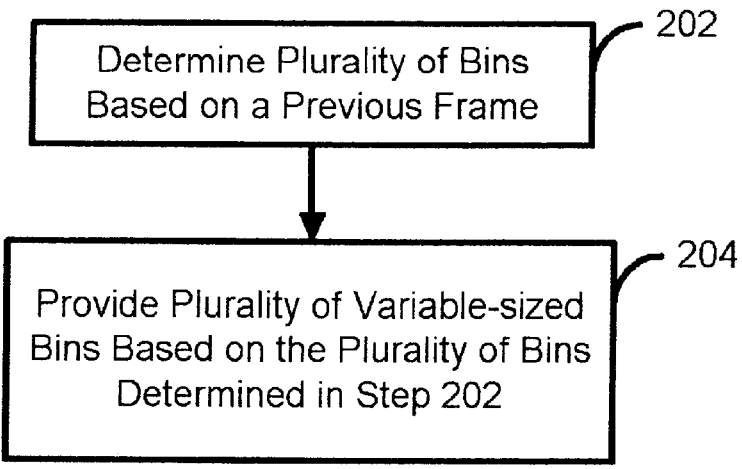
FIG. 7A is a flow chart of a second embodiment of a method for providing variable-sized bins in accordance with the present invention.

FIG. 7A depicts a more detailed flow chart of a second embodiment of a method 200 in accordance with the present invention for providing variable-sized bins. The method 200 is used to render a graphical image that is part of a series of graphical images. Each graphical image in the series in known as a frame. A plurality of bins is determined based on a previous frame, via step 202. Preferably, the plurality of bins was considered to be optimal under some set of criteria for rendering the previous frame. In a preferred embodiment, a set of bins is optimal if the previous frame can be rendered using the smallest total number of bins and having the smallest number of bins which violate the overflow parameter. Thus, each of the plurality of bins provided in step 202 can preferably vary in size. Also in a preferred embodiment, the previous frame is the frame immediately previous to the frame currently being rendered. In one embodiment, the plurality of variable-sized bins was actually used to render the previous frame. Thus, the variable sized bins are determined when the previous frame was rendered. In another embodiment, the plurality of variable-sized bins was not used to render the previous frame, but are determined between frames.

The plurality of variable-sized bins that store the primitives are then provided, via step 204, based on the plurality of bins determined in step 202. In one embodiment, the plurality of variable-sized bins is the same as the bins determined in step 202. In another embodiment, the plurality of variable-sized bins is provided based on the bins determined in step 202. For example, portions of or all of some number of the bins determined in step 202 may be combined or split to provide the variable-sized bins, as discussed below. Step 202 preferably includes storing the primitives in the variable-sized bins in order based on the minimum y-value of the primitives. Step 202 also preferably includes storing the top and bottom scan values.

Figure 7B:
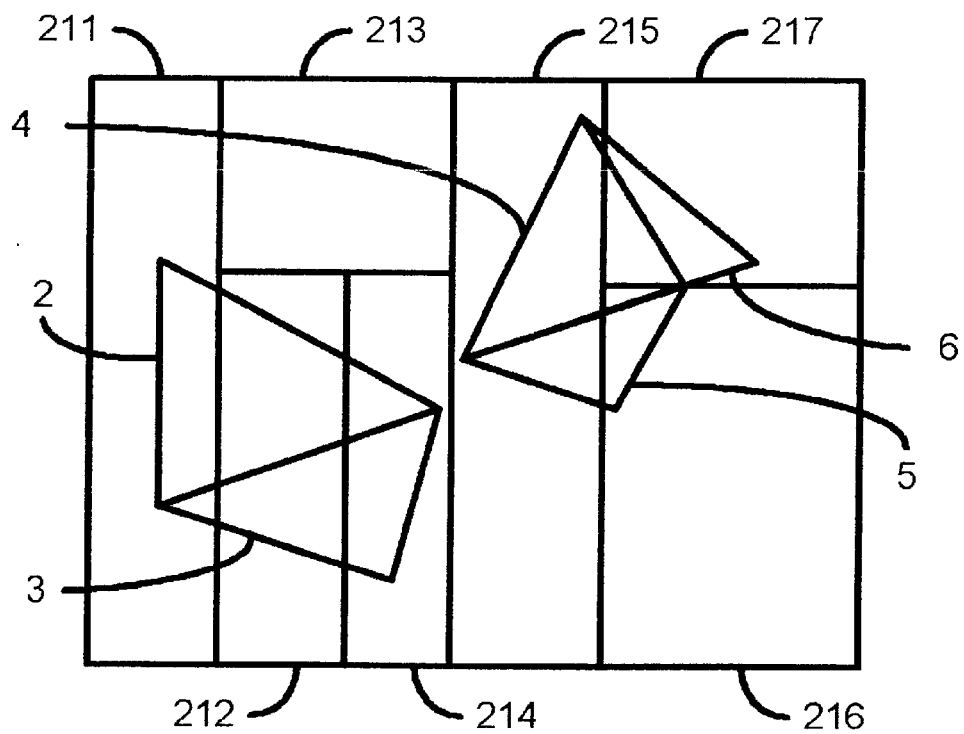
FIG. 7B is a diagram of one way in which a display could be divided in accordance when the second embodiment of a method in accordance with the present invention for providing variable-sized bins.
Figure 7C:
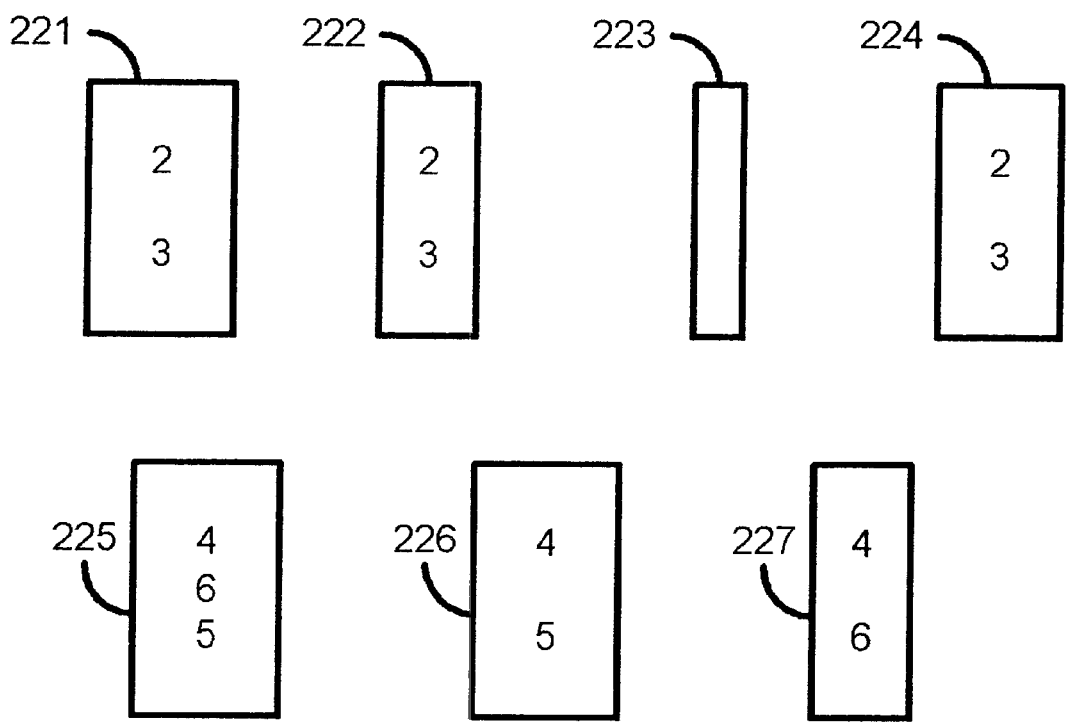
FIG. 7C is a diagram of how the bins are provided and combined in accordance when the second embodiment of a method in accordance with the present invention for providing variable-sized bins.

FIG. 7B depicts the display 210 having a plurality of sections 211, 212, 213, 214, 215, 216, and 217 corresponding to a plurality of bins which were determined based on a previous frame. FIG. 7C depicts the bins 221, 222, 223, 224, 225, 226, and 227 corresponding to the sections 211, 212, 213, 214, 215, 216, and 217, respectively. The bins 221–227 store the primitives 2, 3, 4, 5, and 6. In one embodiment of the method 200, the bins 221–227 are used as the variable-sized bins in the step 204. In another embodiment of the method 200, the variable-sized bins are provided based on the bins 221–227, for example by combining portions of one or more bins 221–227 or by splitting one or more of the bins 221–227. Such an embodiment might be considered to be a combination of the method 200 and the method 140 or 170.

Figure 8A:
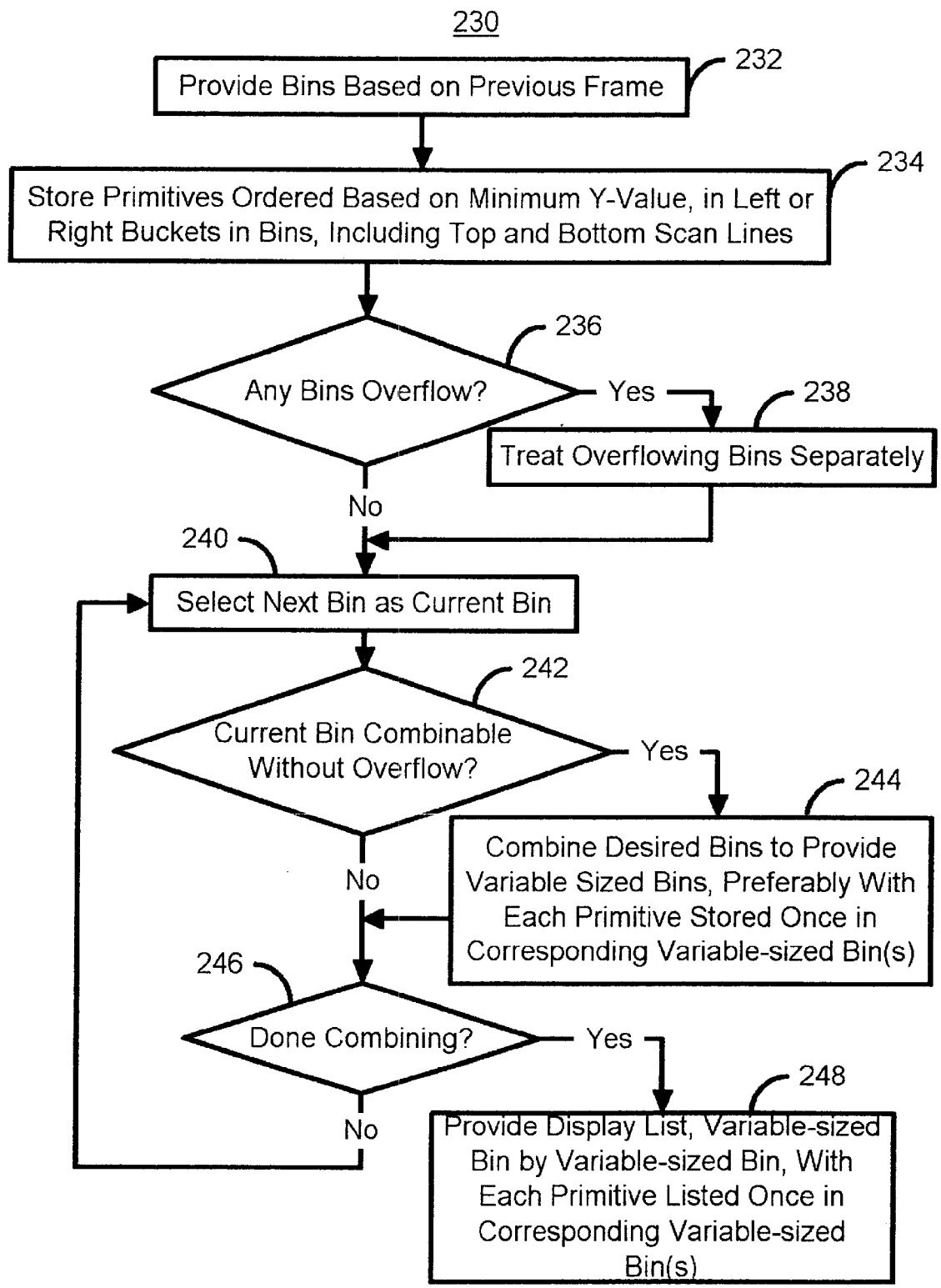
FIG. 8A is a more detailed flow chart of the second embodiment of a method for providing variable-sized bins in accordance with the present invention.

FIG. 8A depicts one version of the second embodiment of a method 230 in accordance with the present invention. The method 230 can be considered to be a combination of the method 200 and the method 170. The plurality of bins is determined based on a previous frame, via step 232. Via step 234, the primitives 2, 3, 4, 5, and 6 are stored in the appropriate buckets of the bins which were determined in step 232. Each bin includes a left bucket and a right bucket. A primitive 2, 3, 4, 5, or 6 is stored in a right bucket if the primitive 2, 3, 4, 5, or 6 crosses a right boundary of a section corresponding to a particular bin. A primitive 2, 3, 4, 5, or 6 is stored in the left bucket if the primitive 2, 3, 4, 5, or 6 does not cross the right boundary of the section corresponding to the particular bin. Thus, storing the primitives 2, 3, 4, 5, and 6 may include storing the data for the primitives in the appropriate buckets. Step 234 also includes ordering the primitives 2, 3, 4, 5, and 6 in the buckets based on the primitives' minimum y-values. Thus, the primitives 2, 3, 4, 5, and 6 are arranged from first to last in the appropriate buckets, based upon the highest point in the display 150 for the primitive. In addition, step 234 includes storing the top and bottom scans for each primitive. The top and bottom scans correspond to the minimum and maximum y-values for the primitive.

It is then determined if any of the bins overflow, via step 236. Thus, step 236 includes determining if any of the bins contain a sufficient number of primitives to violate the overflow parameter. Preferably this is accomplished in one step after the primitives 2, 3, 4, 5, and 6 have been stored in the appropriate bins. Step 236 is also preferably accomplished by using the top scan line and bottom scan line for each primitive store in a bin to determined the whether the number of primitives 2, 3, 4, 5, or 6 on a particular scan line of a bin is greater than the overflow parameter. If certain bins overflow, then these bins are treated separately, via step 238. In a preferred embodiment, step 238 includes overlaying the bins which overflow. In another embodiment, step 238 could include splitting the bins that overflow is splitting the bin will prevent the overflow. In any event, step 238 includes a mechanism which will allow those bins that overflow to be processed preferably without causing an overflow of the system 50.

Referring back to FIG. 8A, a bin is selected as a current bin, via step 240. In a preferred embodiment, step 240 includes selecting a bin as the current bin only if the bin has been determined not to overflow in step 236. It is determined if the current bin can be combined with one or more other bins without the combination overflowing, via step 242. Preferably, at least one of the other bins is adjacent to the current bin and the other bins are mutually adjacent. If the current bin cannot be combined without an overflow, the current bin is considered to be one of the variable-sized bins. If the current bin cannot be combined without an overflow, then it is determined if all of the desired bins have been attempted to be combined, via step 246.

If it is determined that the current bin can be combined, then the current bin is combined with one or more other bins to provide one of the variable-sized bins, via step 244. The bin(s) with which the current bin is combined with are those which were determined in step 242. Preferably, the current bin is combined with other bin(s) such that a primitive in more than one bin only appears once in the variable-sized bin that results from the combination. Step 246 is then returned to. Step 246 determines whether all of the desired bins have been attempted to be combined. If not, then step 240 is returned to. If so, then a display list which orders the primitives variable-sized bin by variable-sized bin is provided, via step 248. In one embodiment, step 244 is performed in step 248. In such an embodiment, providing the display list may also effectively combine the bins by providing the primitives in the bins to be combined together in the display list.

Figure 8B:
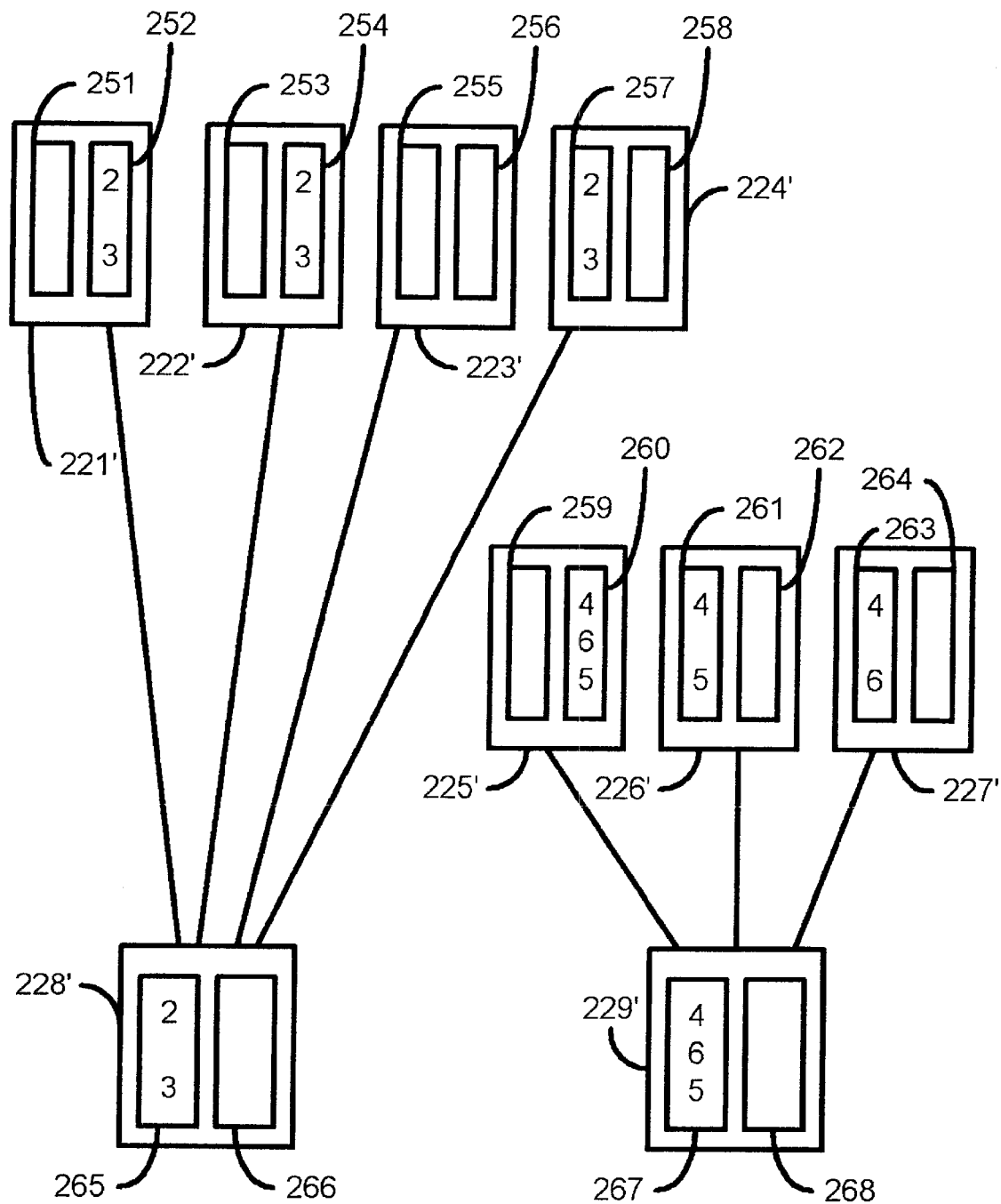
FIG. 8B is a diagram of how the bins are provided and combined in accordance when the preferred version of the second embodiment of a method in accordance with the present invention for providing variable-sized bins.

To further explicate the method 230, refer to FIGS. 8B and 7B. FIG. 8B is a diagram depicting how bins are combined. FIG. 7B depicts the display 210 having a plurality of sections 211, 212, 213, 214, 215, 216, and 217 corresponding to a plurality of bins which were determined based on a previous frame. Referring to FIGS. 7B and 8B, the primitives 2, 3, 4, and 5 are stored in the bins 221', 222', 223', 224', 225', 226', and 227'. The bins 221', 222', 223', 224', 225', 226', and 227' correspond to the sections 211, 212, 213, 214, 215, 216, and 217, respectively. Because the primitives 2 and 3 cross the right boundary of the bin 221' (the section 211), the primitives 2 and 3 are stored in the right bucket 252 of the bin 221'. Because there are no primitives in the display 210 that intersect bin 251' (the section 211) but do not cross the right boundary of the bin 221' (the section 211), the left bucket 251 of the bin 221' is empty. Because the primitives 2 and 3 cross the right boundary of the bin 222' (the section 212), the primitives 2 and 3 are stored in the right bucket 254 of the bin 222'.

Because there are no primitives that intersect bin 222' (the section 212) but do not cross the right boundary of the bin 222' (the section 212), the left bucket 253 of the bin 162' is empty. Because there are no primitives in the bin 223' (the section 213), the left bucket 255 and right bucket 256 of the bin 223' are empty. Because the primitives 2 and 3 intersect but do not cross the right boundary of the bin 224' (the section 214), the primitives 2 and 3 are stored in the left bucket 257 of the bin 224'. Because there are no primitives that intersect bin 224' (the section 214) and cross the right boundary of the bin 224' (the section 214), the right bucket 258 of the bin 224' is empty. Because the primitives 2, 4, and 6 cross the right boundary of the bin 225' (the section 215), the primitives 4, 5, and 6 are stored in the right bucket 260 of the bin 225'. Because no primitives intersect bin 225' (the section 215) but do not cross the right boundary of the bin 225' (the section 215), no primitives are stored in the left bucket 259 of the bin 225'. Because no primitives cross the right boundary of the bin 226' (the section 216), the right bucket 262 of the bin 226' is empty. Because the primitives 4 and 5 intersect the bin 226' (the section 216) but do not cross the right boundary of the bin 226' (the section 216), the primitives 4 and 5 are stored in the left bucket 261 of the bin 226'. Because no primitives cross the right boundary of the bin 227' (the section 217), the right bucket 264 of the bin 227' is empty. Because the primitives 4 and 6 intersect the bin 227' (the section 217) but do not cross the right boundary of the bin 227' (the section 217), the primitives 4 and 6 are stored in the left bucket 263 of the bin 227'.

It is presumed that there are three processors in the processor block 64 of FIG. 2. Thus, the overflow parameter may be three. Referring back to FIGS. 7B and 8B, none of the bins 221'–227', or the corresponding sections 211–217, include more than three primitives 2, 3, 4, 5, and 6. Consequently, none of the bins overflow. Thus, all of the bins 221'–227' are candidates to be combined. Because the overflow parameter is three, the bins 211', 212', 213', and 214' can be combined into bin 228' without overflowing. Thus, primitives 2 and 3 can be stored in a single bin 228' that corresponds to the bins 221'–224' and, therefore, to sections 211–214. For the same reasons, bins 225', 226', and 227' can be combined into a single bin 229' without overflowing.

The bins 221'–227' are also preferably combined such that the primitives 2, 3, 4, and 5 are stored only once in each variable sized bins 228' and 229'. Preferably, this is accomplished by storing only those primitives which are in the left bucket for a bin, except for the last bin that is being combined. For the last bin, those primitives in the right bucket and the left bucket are combined. For example, there are no primitives in the left bucket 251, 253, or 255 for the bins 221', 222', and 223'. Thus, no primitives are added. However, primitives 2 and 3 are in the left bucket 257 for the bin 224'. Consequently, primitives 2 and 3 are stored in the left bucket 265 of the variable-sized bin 228'. Furthermore, there are no primitives in the right buckets 256 and 258 of the last bins 223' and 224' being combined. Thus, no other primitives are stored in the variable-sized bin 228'. Consequently, the variable-sized bin 228' includes primitives 2 and 3 in the left bucket 265 and no primitives in the right bucket 266. Furthermore, the primitives 2 and 3 are stored in order in the variable-sized bin 228' based on their minimum y-values. Note, however, that in an alternate embodiment, the variable-sized bin 228' could include primitives 2 and 3 in both the right bucket 266 and the left bucket 265. Providing the display list might then combine the bins 221', 222', 223', and 224'. In an alternate embodiment, no combining is provided until the display list is provided. In such an embodiment, the display list still combines the bins 221', 222', 223', and 224'.

Similarly, the variable-sized bin 229' includes primitives 4, 5, and 6. When bin 225' is combined, no primitives are added to the buckets 267 and 268 of the variable-sized bin 229' because there are no primitives in the left bucket 259 of the bin 225'. However, when the bins 226' and 227' are combined, the primitives 4, 5, and 6 are stored because they are in the left buckets 261 and 263 of the bins 226' and 227', respectively. If there were primitives in the right buckets 262 and 264, those primitives would have been stored in the variable-sized bin 229' because the bin 226' and 227' are the last bins being combined. Note, however, that in an alternate embodiment, the variable-sized bin 229' could include primitives 4, 5, and 6 in both the right bucket 267 and the left bucket 268. Providing the display list might then combine the bins 225', 226', and 227'. In an alternate embodiment, no combining is provided until the display list is provided. In such an embodiment, the display list still combines the bins 225', 226', and 227'.

A display list is then provided from the variable-sized bins 228' and 229'. The display list preferably provides the primitives variable-sized bin by variable-sized bin and preferably orders the primitives in minimum y-value order. Consequently, the display list would include primitives 2 and 3 then primitives 4, 6, and 5. The portions of primitives 2 and 3 intersecting the variable-sized bin 228' (intersecting sections 211, 212, 213, and 214) are rendered first, followed by the portions of primitives 4, 6, and 5 intersecting the variable sized bin 229' (intersecting sections 215, 216, and 217). The display list allows the primitives in a scan line to be provided in parallel to the processors of the block of processors in FIG. 3 and the pixels in each of the variable-sized bins 228' and 229' pixel by pixel in raster order.

Because the methods 200 and 230 render the graphical image variable-sized bin by variable-sized bin, the efficiency of rendering is improved. Each variable-sized bin either does not overflow or is treated separately. In either case, each variable-sized bin can be rendered without causing an overflow in the computer graphics system, such as the system 50. Therefore, the primitives in a scan line for each variable-sized bin can be provided in parallel to processors in the block of processors 64. Each variable-sized bin can, therefore, be rendered pixel-by pixel in raster order without overflowing or slowing the system 50. Consequently, efficiency of providing graphical images is improved.

A method and system has been disclosed for more efficiently rendering a graphical image. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a graphical image on a display of a system, the graphical image being provided from data describing a plurality of primitives, the display including a plurality of pixels, the method comprising the steps of:

(a) providing a plurality of variable-sized bins containing the plurality of primitives;

wherein the system includes a plurality of processors for processing a portion of the plurality of primitives in parallel, and wherein the variable-sized bin providing step (a) further includes the steps of:
(a1) storing the plurality of primitives in a plurality of bins;
(a2) determining if a part of a portion of the plurality of bins can be combined without causing the plurality of processors to overflow; and
(a3) combining the part of the portion of plurality of bins to provide the plurality of variable-sized bins if the part of the portion of the plurality of bins can be combined without causing the plurality of processors to overflow;
wherein the plurality of variable-sized bins can include fewer bins than the plurality of bins; and
(b) rendering the plurality of primitives by rendering each of the plurality of variable-sized bins variable-sized bin by variable-sized bin.

2. The method of claim 1 wherein the combining step (a3) further includes the steps of: (a3i) combining the part of the portion of the plurality of bins so that a particular primitive of the plurality of primitives is provided only once for a corresponding variable-sized bin of the plurality of variable-sized bins.

3. The method of claim 1 wherein the variable-sized bin providing step (a) further includes the steps of:
(a4) providing a display list containing the plurality of primitives, the display list including the plurality of primitives ordered according to the plurality of variable-sized bins, wherein a particular primitive of the plurality of primitives is provided to the display list only once for a corresponding variable-sized bin of the plurality of variable-sized bins.

4. The method of claim 1, wherein each of the plurality of bins includes a first boundary, wherein each of the plurality of primitives intersects a second portion of the plurality of bins, and wherein the storing step (a1) further includes the step of:
(a1 i) storing each of the plurality of primitives in the second portion of the plurality of bins based on whether the first boundary is crossed.

5. The method of claim/wherein each of the plurality of primitives includes a minimum y value, a top scan line, and bottom scan line, and wherein the storing step (a1) further includes the step of:
(a1 ii) storing each of the plurality of primitives in the second portion of the plurality of bins in an order based on the minimum y value; and
(a1 iii) storing the top scan line and the bottom scan line for each of the plurality of primitives in the second portion of the plurality of bins.

6. A method for providing a graphical image on a display of a system, the graphical image being provided from data describing a plurality of primitives, wherein the system further includes a plurality of processors for processing a portion of the plurality of primitives in parallel, the display including a plurality of pixels, the method comprising the steps of:
(a) providing a plurality of variable-sized bins containing the plurality of primitives and wherein the variable-sized bin providing step (a) further includes the step of:
(a1) determining a plurality of bins for a previous frame; and
(a2) providing the plurality of bins containing the plurality of primitives;
(a3) storing the plurality of primitives in the plurality of bins;
(a4) determining if a part of a portion of the plurality of bins can be combined without causing the plurality of processors to overflow; and
(a5) combining the part of the portion of the plurality of bins to provide the plurality of variable-sized bins if the part of the portion of the plurality of bins can be combined without causing the plurality of processors to overflow; and
(b) rendering the plurality of primitives by rendering each of the plurality of variable-sized bins variable-sized bin by variable-sized bin;
wherein the plurality of variable-sized bins can include fewer bins than the plurality of bins.

7. The method of claim 6 wherein the combining step (a5) further includes the steps of:
(a5i) combining the part of the portion of the plurality of bins so that a particular primitive of the plurality of primitives is provided only once for a corresponding variable-sized bin of the plurality of variable-sized bins.

8. The method of claim 6 wherein the variable-sized bin providing step (a) further includes the steps of:
(a6) providing a display list containing the plurality of primitives, the display list including the portion of the plurality of primitives for each of the plurality of variable-sized bins ordered variable-sized bin by variable-sized bin, wherein a particular primitive of the plurality of primitives is provided to the display list only once for a corresponding variable-sized bin of the plurality of variable-sized bins.

9. A method for providing a graphical image on a display of a system, the graphical image being provided from data describing a plurality of primitives, wherein the system further includes a plurality of processors for processing a portion of the plurality of primitives in parallel, the display including a plurality of pixels, the method comprising the steps of:
(a) providing a plurality of variable-sized bins containing the plurality of primitives;
wherein the variable-sized bin providing step (a) further includes the step of:
(a1) determining a plurality of bins for a previous frame; and
(a2) providing the plurality of bins containing the plurality of primitives
(a3) determining if a portion of the plurality of bins causes the plurality of processors to overflow; and
(a4) splitting each bin of the portion of the plurality of bins into two bins; and
(b) rendering the plurality of primitives by rendering each of the plurality of variable-sized bins variable-sized bin by variable-sized bin.

10. A computer-readable medium containing a program for providing a graphical image on a display of a system, the graphical image being provided from data describing a plurality of primitives, the display including a plurality of pixels, wherein the system includes a plurality of processors for processing a portion of the plurality of primitives in parallel, the program including instructions for:
(a) providing a plurality of variable-sized bins containing the plurality of primitives;
wherein the variable-sized bin providing instructions (a) further includes instructions for:
(a1) storing the plurality of primitives in a plurality of bins;
(a2) determining if a part of a portion of the plurality of bins can be combined without causing the plurality of processors to overflow; and (a3) combining the part of the portion of the plurality of bins if the portion of plurality of bins can be combined without causing the plurality of processors to overflow; and (b) rendering the plurality of primitives by rendering each of the plurality of variable-sized bins variable-sized bin by variable-sized bin; wherein the plurality of variable-sized bins can include fewer bins than the plurality of bins.

11. The computer-readable medium of claim 10 wherein the combining instructions (a3) further includes instructions for:

(a3i) combining the part of the portion of the plurality of bins so that a particular primitive of the plurality of primitives is provided only once for a corresponding variable-sized bin of the plurality of variable-sized bins.

12. The computer-readable medium of claim 10, wherein the variable-sized bin providing instructions (a) further includes instructions for:

(a4) providing a display list containing the plurality of primitives, the display list including the plurality of primitives ordered according to the plurality of variable-sized bins, wherein a particular primitive of the plurality of primitives is provided to the display list only once for a corresponding variable-sized bin of the plurality of variable-sized bins.

13. The computer-readable medium of claim 10 wherein each of the plurality of bins includes a first boundary, wherein each of the plurality of primitives intersects a second portion of the plurality of bins, and wherein the storing instructions (a1) further includes instructions for:

(a1 i) storing each of the plurality of primitives in the second portion of the plurality of bins based on whether the first boundary is crossed.

14. The computer-readable medium of claim 13 wherein each of the plurality of primitives includes a minimum y value, a top scan line, and bottom scan line, and wherein the storing instructions (a1) further includes instructions for:

(a1ii) storing each of the plurality of primitives in the second portion of the plurality of bins in an order based on the minimum y value; and (a1iii) storing the top scan line and the bottom scan line for each of the plurality of primitives in the second portion of the plurality of bins.

15. A computer-readable medium containing a program for providing a graphical image on a display of a system, the graphical image being provided from data describing a plurality of primitives, the display including a plurality of pixels, wherein the system further includes a plurality of processors for processing a portion of the plurality of primitives in parallel, the program including instructions for:

(a) providing a plurality of variable-sized bins containing the plurality of primitives;

wherein the variable-sized bin providing instructions (a) further includes instructions for:

(a1) determining a plurality of bins for a previous frame; and (a2) providing the plurality of bins containing the plurality of primitives (a3) storing the plurality of primitives in the plurality of bins;

(a4) determining if a part of a portion of the plurality of bins can be combined without causing the plurality of processors to overflow; and (a5) combining the part of the portion of the plurality of bins if the part of the portion of the plurality of bins can be combined without causing the plurality of processors to overflow; and (b) rendering the plurality of primitives by rendering each of the plurality of variable-sized bins variable-sized bin by variable-sized bin wherein the plurality of variable-sized bins can include fewer bins than the plurality of bins.

16. The computer-readable medium of claim 15 wherein the combining instructions (a5) further includes instructions for:

(a5i) combining the part of the portion of the plurality of bins so that a particular primitive of the portion of the plurality of primitives is provided only once for a corresponding variable-sized bin of the plurality of variable-sized bins.

17. The computer-readable medium of claim 15 wherein a portion of the plurality of primitives intersect each of a second portion of the plurality of variable-sized bins and wherein the variable-sized bin providing instructions (a) further includes instructions for:

(a6) providing a display list containing the plurality of primitives, the display list including the portion of the plurality of primitives for each of the plurality of variable-sized bins ordered variable-sized bin by variable-sized bin, wherein a particular primitive of the portion of the plurality of primitives is provided to the display list only once for a corresponding variable-sized bin of the plurality of variable-sized bins.

18. A computer-readable medium containing a program for providing a graphical image on a display of a system, the graphical image being provided from data describing a plurality of primitives, the display including a plurality of pixels, wherein the system further includes a plurality of processors for processing a portion of the plurality of primitives in parallel, the program including instructions for:

(a) providing a plurality of variable-sized bins containing the plurality of primitives;

wherein the variable-sized bin providing instructions (a) further includes instructions for:

(a1) determining a plurality of bins for a previous frame; and (a2) providing the plurality of bins containing the plurality of primitives (a3) determining if a portion of the plurality of bins causes the plurality of processors to overflow; and (a4) splitting each bin of the portion of the plurality of bins into two bins; and (b) rendering the plurality of primitives by rendering each of the plurality of variable-sized bins variable-sized bin by variable-sized bin.

19. A system for providing a graphical image on a display, the graphical image being provided from data describing a plurality of primitives, the display including a plurality of pixels, wherein the system includes a plurality of processors for processing a portion of the plurality of primitives in parallel, the system comprising:

means providing a plurality of variable-sized bins containing the plurality of primitives, the plurality of bins having a variable size;

and wherein the variable-sized bin providing means further includes:

means for storing the plurality of primitives in a plurality of bins;

means for determining if a part of a portion of the plurality of bins can be combined without causing the plurality of processors to overflow; and means for combining the part of the portion of the plurality of bins if the part of the portion of the plurality of bins can be combined without causing the plurality of processors to overflow; and means, coupled with the providing means, for rendering the plurality of primitives by rendering each of the plurality of variable-sized bins variable-sized bin by variable-sized bin wherein the plurality of variable-sized bins can include fewer bins than the plurality of bins.

20. The system of claim 19, wherein the variable-sized bin providing means further includes:

means for combining the part of the portion of the plurality of bins so that a particular primitive of the plurality of primitives is provided only once for a corresponding variable-sized bin of the plurality of variable-sized bins.

21. The system of claim 19 wherein the variable-sized bin providing means further includes:

means for providing a display list containing the plurality of primitives, the display list including the plurality of primitives ordered according to the plurality of variable-sized bins, wherein a particular primitive of the plurality of primitives is provided to the display list only once for a corresponding variable-sized bin of the plurality of variable-sized bins.

22. A system for providing a graphical image on a display, the graphical image being provided from data describing a plurality of primitives, further including a plurality of processors for processing a portion of the plurality of primitives in parallel, the display including a plurality of pixels, the system comprising:

means providing a plurality of variable-sized bins containing the plurality of primitives, the plurality of bins having a variable size; wherein the variable-sized bin providing means further includes:

means for determining a plurality of bins for a previous frame;

means for providing the plurality of bins containing the plurality of primitives;

means for storing the plurality of primitives in the plurality of bins;

means for determining if a part of a portion of the plurality of bins can be combined without causing the plurality of processors to overflow; and means for combining the part of the portion of the plurality of bins if the portion of the plurality of bins can be combined without causing the plurality of processors to overflow;

wherein the plurality of variable-sized bins can include fewer bins than the plurality of bins; and means, coupled with the providing means, for rendering the plurality of primitives by rendering each of the plurality of variable-sized bins variable-sized bin by variable-sized bin.

23. The system of claim 22 further comprising a plurality of processors for processing a portion of the plurality of primitives in parallel and wherein the variable-sized bin providing means further includes:

means for determining if a portion of the plurality of bins causes the plurality of processors to overflow; and means for splitting each bin of the portion of the plurality of bins into two bins.

* * * * *